United States Patent
Dennedy et al.

(10) Patent No.: US 11,575,728 B2
(45) Date of Patent: Feb. 7, 2023

(54) METHODS AND APPARATUS FOR JUST-IN-TIME STREAMING MEDIA

(71) Applicant: GoPro, Inc., San Mateo, CA (US)

(72) Inventors: Daniel Dennedy, Oceanside, CA (US); Rahul Iyengar, Union City, CA (US); Cedric Fernandes, San Ramon, CA (US)

(73) Assignee: GoPro, Inc., San Mateo, CA (US)

( * ) Notice: Subject to any disclaimer, the term of this patent is extended or adjusted under 35 U.S.C. 154(b) by 78 days.

(21) Appl. No.: 17/320,503

(22) Filed: May 14, 2021

(65) Prior Publication Data
US 2022/0368746 A1 Nov. 17, 2022

(51) Int. Cl.
*H04L 65/70* (2022.01)
*G06F 9/54* (2006.01)
*H04L 65/65* (2022.01)

(52) U.S. Cl.
CPC .............. *H04L 65/70* (2022.05); *G06F 9/547* (2013.01); *H04L 65/65* (2022.05)

(58) Field of Classification Search
CPC .......... H04L 65/70; H04L 65/65; G06F 9/547
See application file for complete search history.

(56) References Cited

U.S. PATENT DOCUMENTS

| 10,484,621 | B2 | 11/2019 | Adsumilli | |
|---|---|---|---|---|
| 2018/0034880 | A1* | 2/2018 | Choi | H04L 65/765 |
| 2019/0342585 | A1* | 11/2019 | Valliere | H04L 65/80 |

OTHER PUBLICATIONS

T. Lohmar, T. Einarsson, P. Fröjdh, F. Gabin and M. Kampmann, "Dynamic adaptive HTTP streaming of live content," 2011 IEEE International Symposium on a World of Wireless, Mobile and Multimedia Networks, 2011, pp. 1-8, doi: 10.1109/WoWMoM.2011. 5986186. (Year: 2011).*

* cited by examiner

*Primary Examiner* — Jonathan A Bui
(74) *Attorney, Agent, or Firm* — Wang Hardoon, P.C.

(57) ABSTRACT

Methods and apparatus for just-in-time streaming media. Existing content delivery networks are optimized for providing mass media to many consumers. This delivery model is poorly suited to user-specific content. Exemplary embodiments of the present disclosure create a program instance that can service a client's media requests from their archival data. In one specific implementation, the archival data is stored segments that are ready for streaming; a content server may provide either a consolidated file or a media "quasi-stream" from the same storage object(s). The quasi-stream supports progressive playback (media playback as it is being downloaded.) The program instance provides the client device the illusion of a static file system, however client requested access to HTTP file downloads are provided in packets that are transmuxed/transcoded from archival data. The various solutions described herein directly address a problem that is unique to providing access to client-specific data archives anytime, anywhere.

20 Claims, 9 Drawing Sheets

METHODS AND APPARATUS FOR JUST-IN-TIME STREAMING MEDIA

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates to content delivery. Specifically, the present disclosure relates to streaming media, such as within consumer media applications.

DESCRIPTION OF RELATED TECHNOLOGY

Existing schemes for content delivery often leverage content delivery networks (CDN); CDNs are geographically distributed networks of proxy servers that can provide media to users from local media caches. The close proximity service can offer higher performance and availability for the cached files. CDN-based distribution often must balance file size, frequency of use, and quality. Thus, for example, CDNs are best used to provide frequently requested content (popular media titles, etc.) to large populations of viewers.

Unfortunately, CDNs are not well suited to handle less popular media formats (e.g., highest quality media), archival media which is infrequently accessed, and/or user-specific media (home videos, etc.) Since the vast majority of content has been popular mass media (commercial movies, television, etc.), these fringe use cases have been neglected. More recently however, widespread broadband and changes in consumer behavior have resulted in more focus on niche and individualistic tastes.

In 2016, GoPro, Inc. launched cloud services that provide users access to their own individual footage and photos from anywhere, anytime, and at native capture resolution quality. The service has steadily grown in popularity, and now, new and improved solutions are needed for handling user-specific media, at high quality (natively captured, without image quality degradation), in aggressive consumer usage scenarios (live streaming).

SUMMARY

The present disclosure discloses, inter alia, system, methods, and apparatus for just-in-time streaming media.

In one aspect, systems, methods, and apparatus configured to quasi-stream media are disclosed. One exemplary method includes: receiving a first request for a non-existent first data structure of a static file system at a streaming media server; obtaining a second data structure that is related to the non-existent first data structure; instantiating a file system-like application programming interface at the streaming media server that generates a requested data structure from the second data structure; receiving a second request for data segments based on the requested data structure at the streaming media server; obtaining a subset of an archival file; and generating quasi-streaming data segments from the subset of the archival file. In a related embodiment, an apparatus configured to perform the foregoing techniques is described. In one exemplary embodiment, the apparatus may include a processor, and a non-transitory computer-readable medium comprising one or more instructions which when executed, cause the apparatus to: receive a first request for a non-existent first data structure of a static file system at a streaming media server; obtain a second data structure that is related to the non-existent first data structure; instantiate a file system-like application programming interface at the streaming media server that generates a requested data structure from the second data structure; receive a second request for data segments based on the requested data structure at the streaming media server; obtain a subset of an archival file; and generate quasi-streaming data segments from the subset of the archival file.

In one aspect, systems, methods, and apparatus configured to quasi-stream media are disclosed. One exemplary streaming media server apparatus includes: a first network interface configured to communicate with an archival file system; a second network interface configured to communicate with a client device; a processor; and a non-transitory computer-readable medium. In one exemplary embodiment, the non-transitory computer-readable medium stores instructions which when executed by the processor, causes the streaming media server apparatus to: store streaming assets within a static file structure; receive a request for a non-existent streaming asset from the client device; access an archival file via the first network interface; instantiate a file system-like application programming interface that generates quasi-streaming data segments from the archival file; and provide the quasi-streaming data segments to the client device via the second network interface. In a related embodiment, a method configured to perform the foregoing techniques is described. In one exemplary embodiment, the method includes: storing streaming assets within a static file structure; receiving a request for a non-existent streaming asset from a client device; accessing an archival file via a first network interface; instantiating a file system-like application programming interface that generates quasi-streaming data segments from the archival file; and providing the quasi-streaming data segments to the client device via the second network interface.

In one aspect, methods and apparatus configured to provide file system-like access to quasi-streamable assets are disclosed. One exemplary non-transitory computer-readable medium stores instructions that when executed by a processor, causes the processor to: store streamable assets within a static file structure; instantiate a file system-like application programming interface that provides access to quasi-streamable assets via a non-existent file structure; provide a master playlist with the streamable assets and the quasi-streamable assets; and provide data segments from the streamable assets or the quasi-streamable assets in response to a data segment request. In a related embodiment, a method configured to perform the foregoing techniques is described. One exemplary method includes: storing streamable assets within a static file structure; instantiating a file system-like application programming interface that provides access to quasi-streamable assets via a non-existent file structure; providing a master playlist with the streamable assets and the quasi-streamable assets; and providing data segments from the streamable assets or the quasi-streamable assets in response to a data segment request.

In a further aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device includes a multi-logic block FPGA device.

In another aspect, a non-transitory computer readable storage apparatus implementing one or more of the foregoing aspects is disclosed and described. In one embodiment, the computer readable apparatus includes a program memory, or an EEPROM. In another embodiment, the apparatus includes a solid-state drive (SSD) or other mass storage device. In another embodiment, the apparatus includes a USB or other "flash drive" or other such portable removable storage device.

In yet a further aspect, a system is disclosed. In one embodiment, the system includes one or more camera apparatus configured on accordance with one or more of the foregoing aspects.

Other aspects, features and advantages of the present disclosure will immediately be recognized by persons of ordinary skill in the art with reference to the attached drawings and detailed description of exemplary embodiments as given below.

DETAILED DESCRIPTION

In the following detailed description, reference is made to the accompanying drawings which form a part hereof, wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Existing Techniques for Streaming Delivery

Content delivery networks generally support two types of media delivery: file download and streaming. File downloads transfer media in aggregate; the media may be packetized and delivered over transport protocols. In many cases, file downloads can benefit from network transport layer safeguards e.g., data that is lost can be corrected and resent, network congestion can be mitigated, etc. Notably, downloaded video files must be reconstructed in full before playback or use. Since most videos are multiple Gigabytes (GB) in size, file downloads are seldom used for videos delivery.

Figure 1:
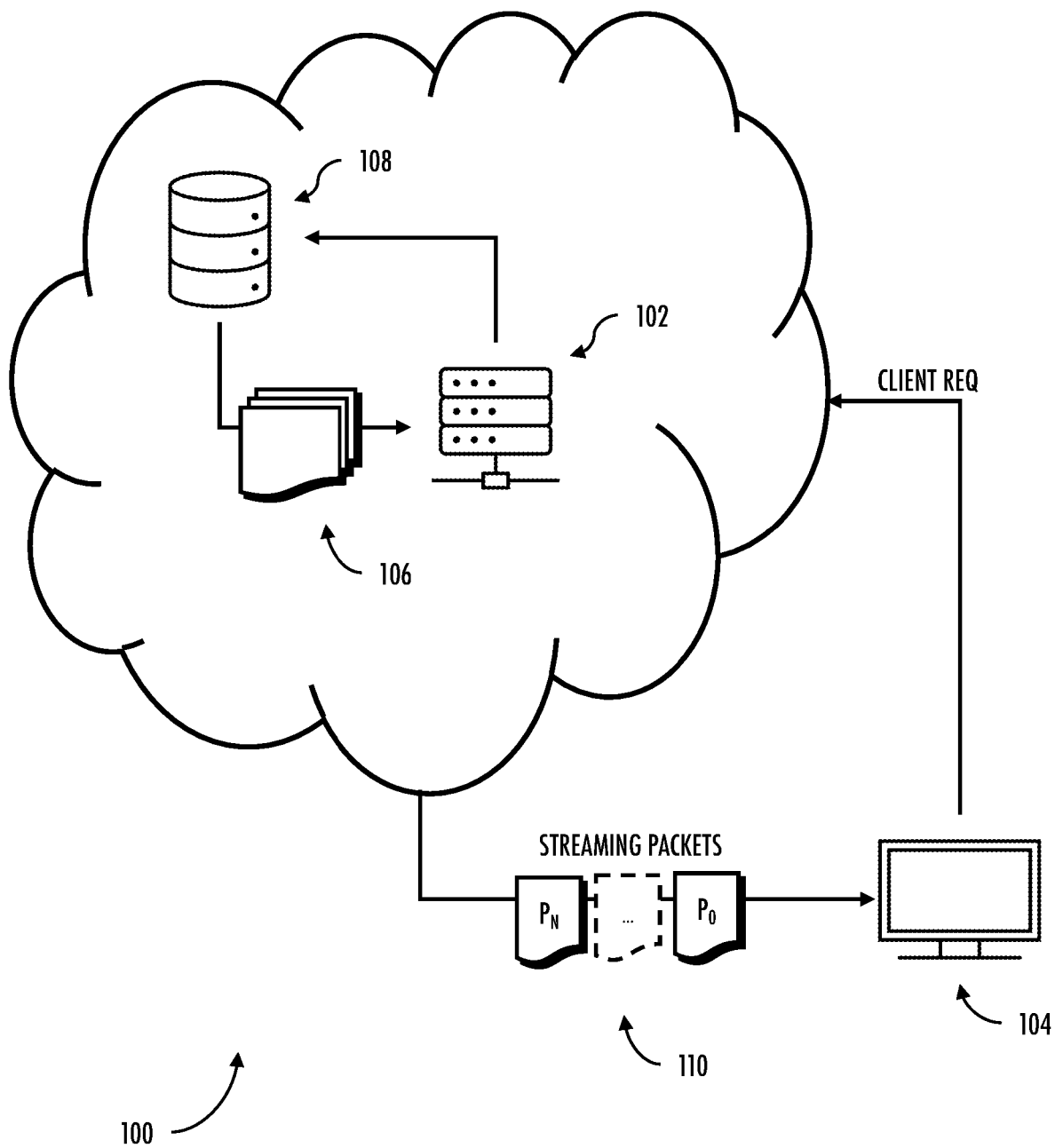
FIG. 1 is a logical block diagram of one streaming network architecture useful in explaining various aspects of the present disclosure.

Streaming media transfers media as playable segments (e.g., 2 second snippets, etc.) Referring now to FIG. 1, a logical block diagram of one streaming network architecture 100 useful in explaining various aspects of the present disclosure is depicted. The network architecture 100 may include content servers 102. The content servers 102 may be configured to communicate with a population of user devices 104 according to a client/server protocol. Client/server protocols enable a few servers to service many clients; each client can access the server's resources to complete client-side tasks. In order to optimize client interactions, the server caches frequently used data e.g., popular media. As shown, a client device 104 requests content from content servers 102; the content servers 102 obtain the necessary streaming files 106 from a file repository 108. The streaming files have been pre-segmented into packets 110 that can be sent to the client for playback. In this manner, the user can start the streaming video playback as soon as it has received (and buffered) a few packets, but before the entire video is received.

Figure 2:
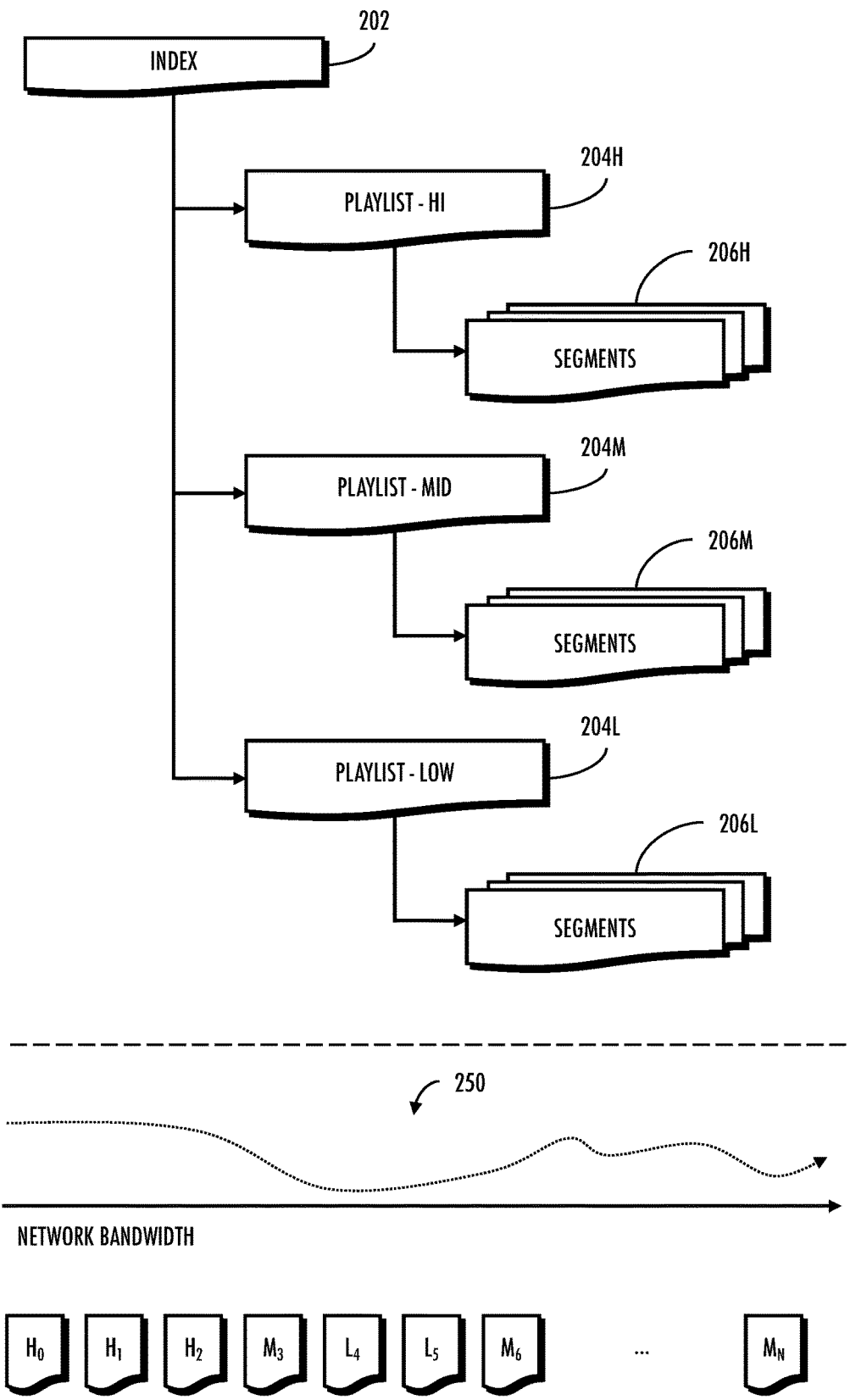
FIG. 2 is a graphical representation of one file system useful for providing variable bit rate streaming packets, useful in explaining various aspects of the present disclosure.

Even though streaming delivery allows the user to start playback before all the packets of a media file are received, only packets that have been received in full can be played. Missing packets and/or corrupted packets must be skipped which can result in poor user experience. Consequently, certain streaming implementations use variable bit rate packets to optimize performance over fluctuating network conditions. FIG. 2 presents one scheme for providing variable bit rate streaming packets, useful in explaining various aspects of the present disclosure. As shown therein, the streaming files may be segmented into 3 components: (i) a top-level index 202, (ii) a rate specific playlist 204H, 204M, 204L, and (iii) video segments of varying quality 206H, 206M, 206L. These files may be organized into a hierarchical directory structure as follows:

./toplevelindex/
./toplevelindex/playlist_hi/
./toplevelindex/playlist_hi/segment_t0.ts
./toplevelindex/playlist_hi/segment_t1.ts
. . .
./toplevelindex/playlist_hi/segment_tN.ts
./toplevelindex/playlist_mid/
./toplevelindex/playlist_mid/segment_t0.ts
./toplevelindex/playlist_mid/segment_t1.ts
. . .
./toplevelindex/playlist_mid/segment_tN.ts
./toplevelindex/playlist_low/
./toplevelindex/playlist_low/segment_t0.ts
./toplevelindex/playlist_low/segment_t1.ts
. . .
./toplevelindex/playlist_low/segment_tN.ts As shown in FIG. 2, variable bit rate streaming packets can be used to provide reduced quality packets during periods of low network bandwidth 250. In the illustrated scenario 250, high quality video packets ($H_0$, $H_1$, $H_2$, etc.) can be provided while bandwidth is good. Lower quality packets ($M_3$, $L_4$, $L_5$, etc.) may be provided when bandwidth has been reduced. Providing reduced (but still playable) video quality is generally preferred over attempting to send higher quality packets that may be dropped.

Unfortunately, existing solutions for streaming media are optimized for mass media delivery. For example, content delivery networks use so-called "HTTP Live Streaming" (HLS) and MPEG-DASH. These streaming protocols use widely accepted HTTP protocols to provide MPEG-2 video over the Internet. For example, an HLS playlist may provide a listing of URL addresses where HTTP-based segment downloads can be reached. Most implementations only support the most popular legacy MPEG-2 resolutions of 1080p (1920×1080), 720p (960×720), and 480p (640×480). In other words, mass media content delivery networks encode their media to only the most popular legacy formats, so as to accommodate a large population of users that decode the same media many times over many different network conditions. Such techniques are commercially inefficient for media that is highly user specific, infrequently requested, and/or requested at unusual/non-standard resolutions (e.g., natively captured resolutions, etc.)

In 2016, GoPro, Inc. launched cloud services that provide users access to their own individual footage and photos from anywhere, anytime, and at native capture resolution quality. Unlike mass media, user generated media is shot on devices that change every year according to aggressive market trends. Such media is often highly individual and user-specific, i.e., user generated media is most commonly used to memorialize important events at full fidelity (e.g., vacations, weddings, etc.) Typically, such content may be archived for long periods of time at native resolution, and then retrieved for manual editing and/or curated for specific use.

In terms of technology, GoPro's products circa 2021 (including the Hero 9, Hero 8, and Max) encode videos and images at MPEG-4. MPEG-4 is a much more advanced encoding standard than MPEG-2; MPEG-4 has substantial advantages over MPEG-2 when considered in the specific context of user generated content. Notably, MPEG-4 uses a discrete cosine transform with a larger block size (16×16 versus 8×8 of MPEG-2); the larger block size of MPEG-4 allows for a much higher compression rate for the same image quality when compared to MPEG-2, this is desirable when archiving high image quality footage. In terms of image quality, the larger block sizes of MPEG-4 are also designed to support larger display sizes and higher resolutions such as are commonly found in niche consumer electronics markets. Furthermore, while network performance is important, consumer interest in their own content is not fickle, e.g., a user that is trying to retrieve their vacation videos is willing to wait a few moments for buffering delay i.e., they will not "channel surf" to something else.

In view of the foregoing, improved methods and apparatus for streaming media are needed. Ideally, such techniques may be performed in response to the client request based on existing archival data. More generally, various aspects of the present disclosure are directed to just-in-time streaming content.

Exemplary Network Architecture for Streaming User Generated Content

Figure 3:
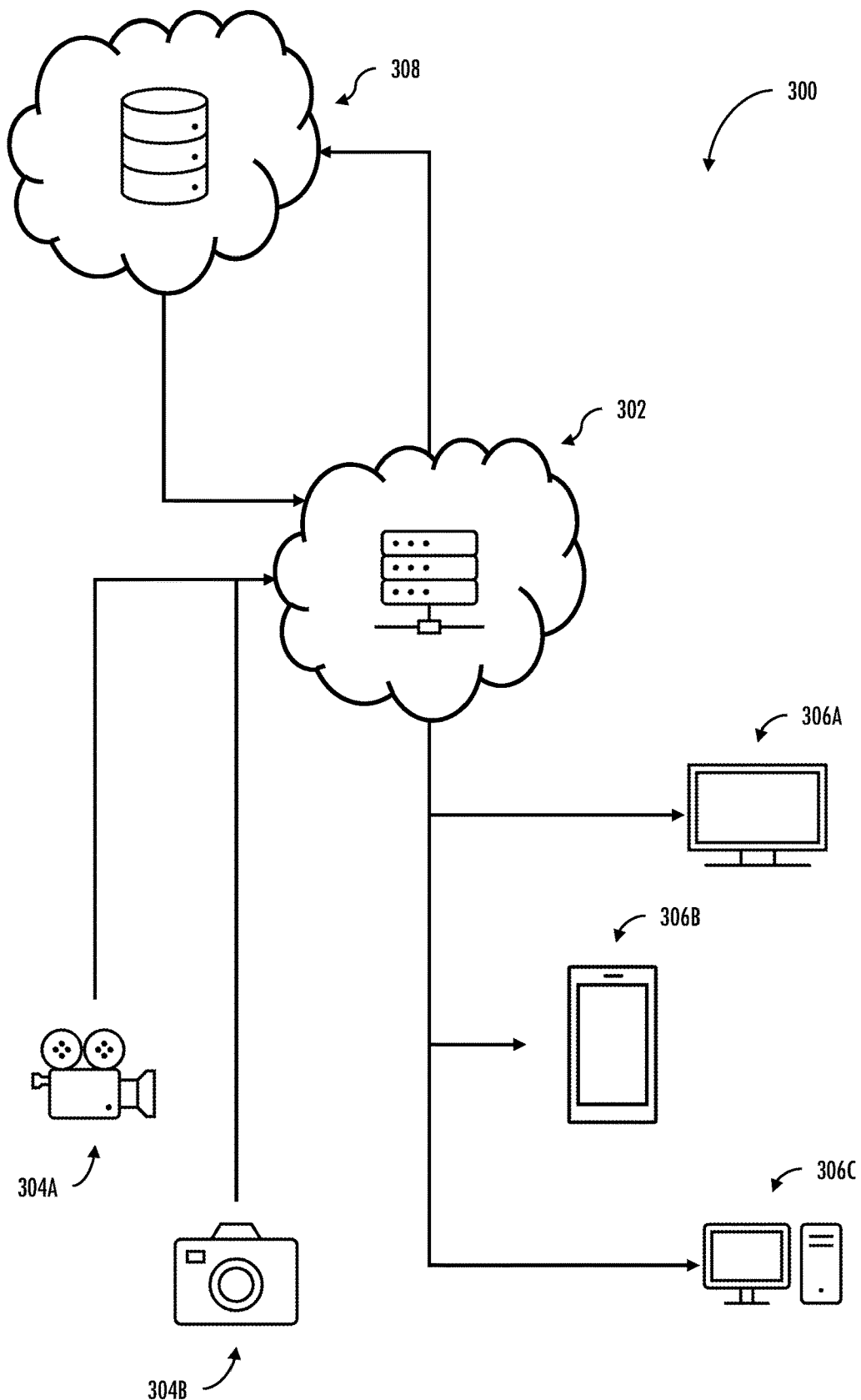
FIG. 3 is a logical block diagram of one exemplary network architecture for just-in-time streaming media, useful in explaining various aspects of the present disclosure.

FIG. 3 is a logical block diagram of one exemplary network architecture 300 for just-in-time streaming media, useful in explaining various aspects of the present disclosure. The network architecture 300 may include content servers 302. The content servers 302 are configured to communicate with one or more capture devices 304A, 304B and one or more playback devices 306A, 306B, 306C, according to a client/server protocol. Client/server protocols are often designed to support many clients with a few servers; in some cases, client/server protocols may emphasize legacy support, ad hoc connectivity, and/or only guarantee a minimum level of service (e.g., so-called "best effort" delivery). In some cases, the content servers may also be configured to communicate with an archival service 308 according to a dedicated server/archive protocol. The server/archive protocol may use specialized, esoteric, and/or proprietary protocols to enable delivery of large amounts of data at high rates.

In one exemplary implementation, the content servers 302 obtain user generated audio/visual (AV) media (images, audio, and/or video) from capture devices 304A, 304B; the media is archived for long-term storage via the archival service 308. In some cases, the media may be archived in its original captured format (e.g., for GoPro devices circa 2021, MPEG-4); in other cases, the media may be encoded to an archival format. Archival formats may be used to trade-off different file attributes, e.g., file size, file quality, file segmentation, file access, etc.

At a later point in time, the content servers may receive media requests from the playback devices 306A, 306B, 306C. In one exemplary embodiment, the media requests support variable bit rate streaming delivery e.g., MPEG-2 transport streams via HTTP Live Streaming (HLS). Responsively, the content servers obtain the requested media from the archival service and transmux or transcode some or all of the content just-in-time.

In one exemplary embodiment, the content servers transmultiplex the media content from the stored format (e.g., original or archival) into a format suitable for streaming delivery. In one specific implementation, a MPEG-4 archival copy is transmultiplexed or "transmuxed" (e.g., re-packaging or re-packetizing media files into a different delivery formats without changing the files' contents) into an MPEG-2 transport stream for delivery over HTTP Live Streaming (HLS). Notably, existing MPEG-4 codecs are backward compatible with MPEG-2 transport streams; thus, a device can obtain the variable bit rate HLS stream and unpack the transmuxed MPEG-4 payloads from MPEG-2 transport stream encapsulation for playback.

In another exemplary embodiment, the content servers may transcode the media content from the stored format into a format suitable for the requesting playback device. In one specific implementation, a MPEG-4 archival copy is transcoded (e.g., decoded and re-encoded) into an MPEG-2 transport stream for delivery over HTTP Live Streaming (HLS). Transcoding is more computationally expensive than transmuxing but may allow for more flexibility and/or support over a wider range of applications.

As a brief aside, media files often include a myriad of different capture and playback parameters. Examples of capture parameters may include e.g., exposure, shutter speed, color balance; examples of playback parameters may include e.g., frame sizes, frame rates, resolutions, audio/video bitrates, etc. Additionally, network connectivity is highly dynamic and may frequently change; examples of network connectivity parameters may include e.g., uplink/downlink bandwidth, error rate (e.g., bit error rate, block error rate, packet error rate, etc.), historic performance, network latency, total throughput, etc. In some cases, the media request from a particular client device may include information about the client computing platform's capability and/or current network connectivity. This information may be used to transmux or transcode to a media format that is suitable for delivery to the client computing platform under the current conditions.

As but one such example, consider a video that was natively captured by a first capture device 304A at 5K (5120×2880) 30 frames per second (fps) and encoded as an MPEG-4 file for archival. Initially, the file may be requested for playback on a 4K UHD TV 306A and transcoded to a format suitable for UHD TV (4096×3072 at 30 fps). Later, the user may edit the video and generate a 1080p MPEG-4 clip. Thereafter, the user can retrieve the media for playback on their smart phone 306B; the video may be transmuxed into from the archived MPEG-4 to a 1080p MPEG-2 HLS transport stream for the phone's native resolution. As but another such example, consider an image that was natively captured by a second capture device 304B at 20 Megapixels (5184×3888); social media sites often restrict file sizes (e.g., a maximum size of 1080×1080), in this case, the user transcodes the image specifically for the desired social media application on the personal computing web browser 306C from their archived MPEG-4.

It should be appreciated that the exemplary network architecture 100 is provided only for illustrative purposes; other network architectures may be substituted by artisans of ordinary skill in the related arts given the contents of the present disclosure. For example, while the foregoing process is described as being a client/server and server/archive; other implementations may use e.g., peer-to-peer, distributed networks, cloud networks, fog networks, etc. Common network topologies that may be substituted with equal success include, without limitation: bus, star, ring, mesh, etc.

Example Operation

Consider the following scenario: a user subscribes to a cloud service for their user generated content. The cloud service offers native resolution archival and live streaming via the Internet. While on vacation, the user captures a MPEG-4 1080p video (e.g., camera 304A) and the video is archived in its native resolution (e.g., at archival service 308). The user additionally generates a reduced resolution version of their video for sharing via social media on mobile devices (e.g., locally cached at server 302). A few months later, the user decides to stream their vacation videos.

Figure 4:
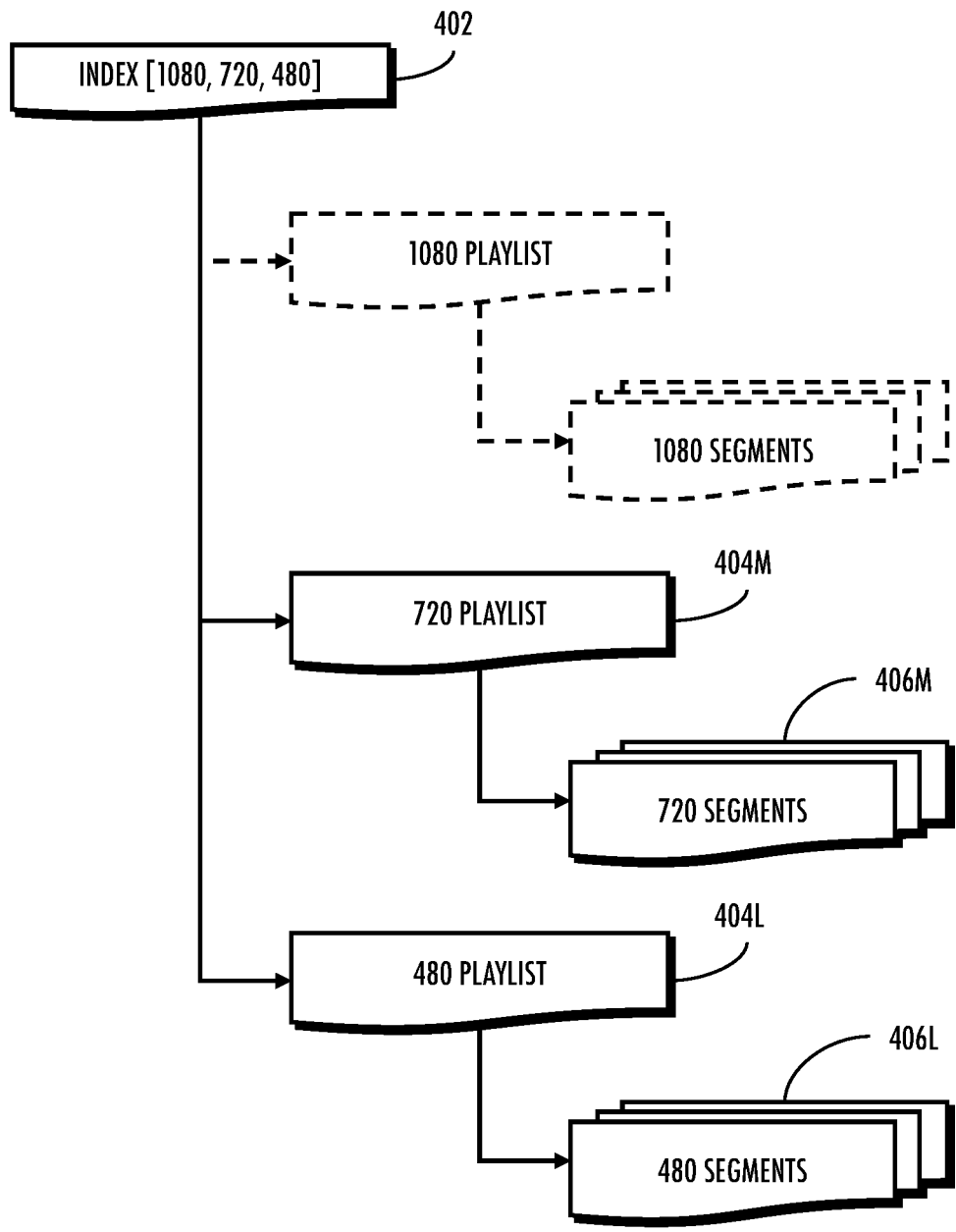
FIG. 4 is a graphical illustration of exemplary static data structures that are useful in explaining various aspects of the present disclosure.

In order to maximize user experience, the cloud service prepares a video stream at the highest quality. In this scenario, the server can support HTTP Live Streaming (HLS) in both 720p and 480p, but 1080p HLS must be generated near real-time from the archival copy. FIG. 4 is a graphical illustration of the static data structures that are initially present (e.g., at server 302). The static data structure may be organized into a hierarchical directory structure as follows:

./toplevelindex/
./toplevelindex/playlist_720
./toplevelindex/playlist_720/segment_t0.ts
./toplevelindex/playlist_720/segment_t1.ts
...
./toplevelindex/playlist_720/segment_tN.ts
./toplevelindex/playlist_480
./toplevelindex/playlist_480/segment_t0.ts
./toplevelindex/playlist_480/segment_t1.ts
...
./toplevelindex/playlist_480/segment_tN.ts As shown in FIG. 4, the streaming files include: (i) a top-level index 402, (ii) rate specific playlists for each of the 720p and 480p videos (404M, 404L), and (iii) corresponding video segments 406M, 406L. The user's 1080p video is archived as an MPEG-4 file on an external server and is not available locally as HLS assets.

Figure 5:
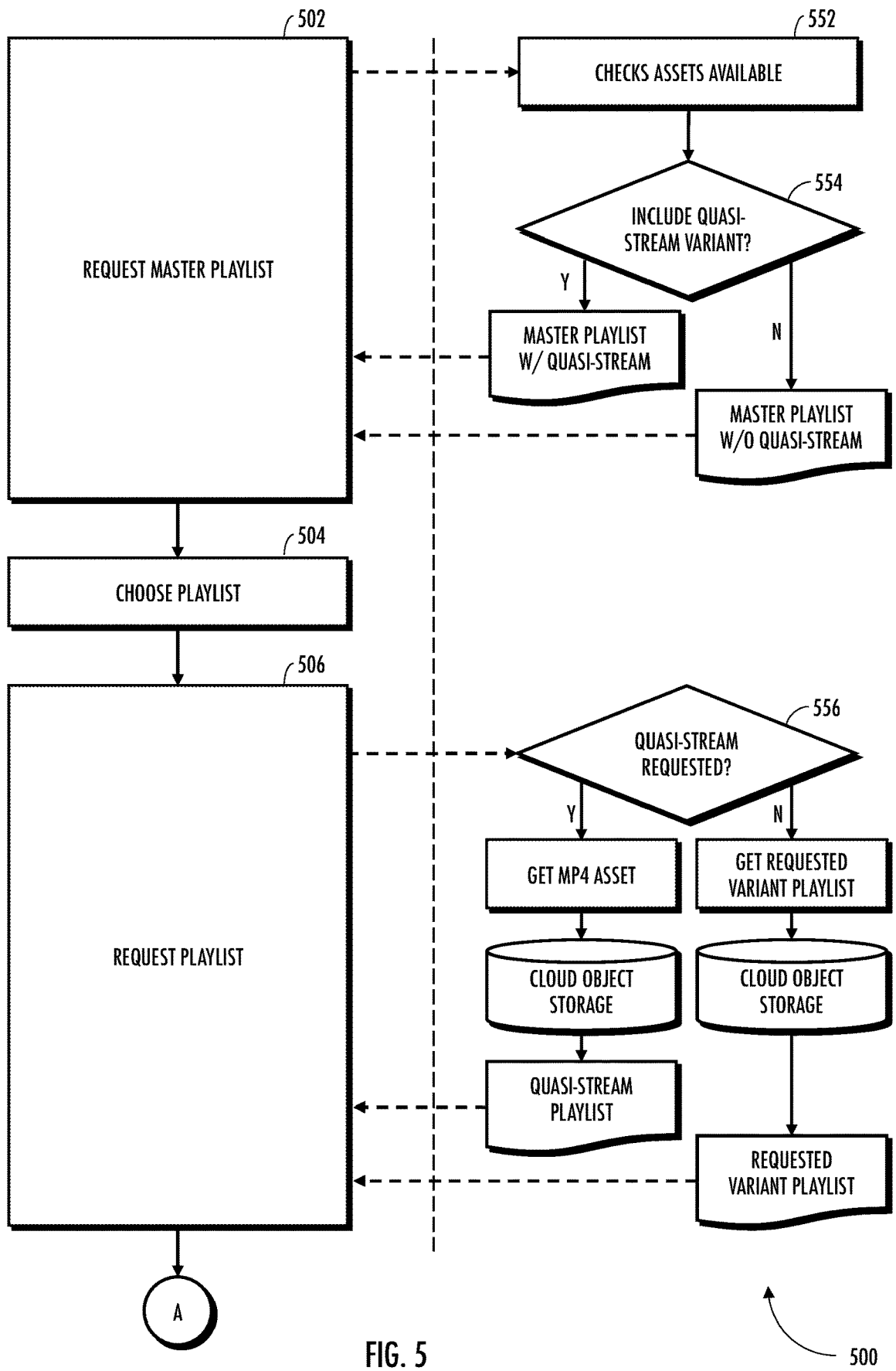
FIG. 5 is a logical block diagram of one exemplary method for just-in-time streaming media, in accordance with various aspects of the present disclosure.
Figure 5:
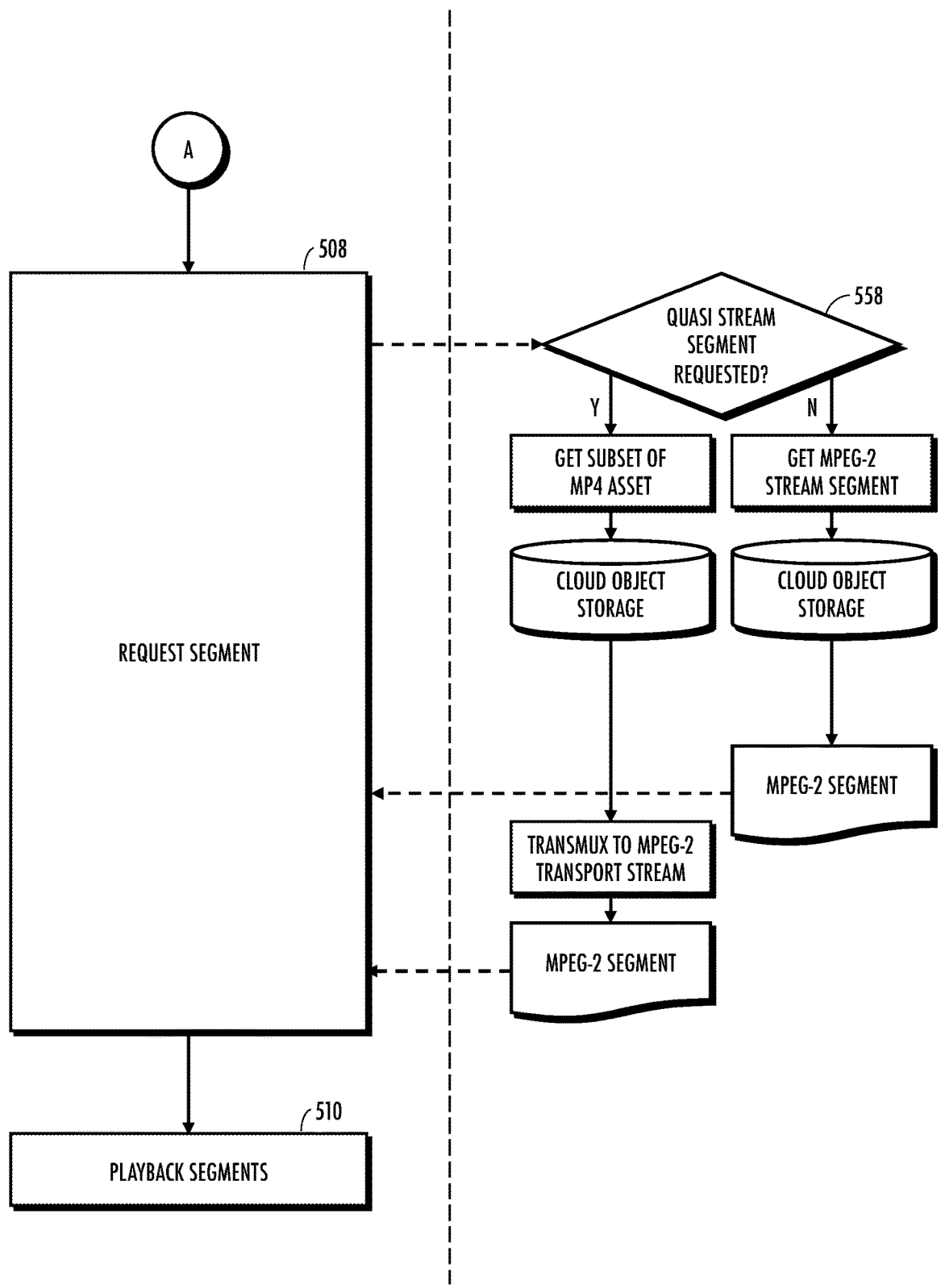

Referring now to FIG. 5, a logical block diagram of one exemplary method 500 for just-in-time streaming media is shown.

At step 502, a client device requests a master playlist to stream an asset. The server responsive checks its available assets (steps 552); in this example, the locally available streaming assets include the 720p assets (404M, 406M) and the 480p assets (404L, 406L). Additionally, the server accesses its file archives (e.g., via a server/archival query to the archival service 308); in this case, the server determines that a 1080p MPEG-4 file has been archived.

In one exemplary embodiment, the server considers a variety of system factors to decide whether the 1080p MPEG-4 file should be included (step 554) as a quasi-streamable asset. In this case, the server checks the current client device capability and network connection quality; and decides to return a master playlist that includes both the available streaming assets, as well as a quasi-streamable asset (derived from the 1080p MPEG-4 file.) More broadly, the server may consider network congestion, device capability, bandwidth to the archival service, bandwidth to the user device, user device capability (display size, processing and/or memory resources, etc.), historic network performance, and/or any other system consideration. In some cases, the server may also consider user-specific factors; examples of such considerations may include e.g., user priority, media type, history of use, etc.

At step 504, the client device selects the desired playlist. In some cases, the playlist options may be manually selected by a user. Alternatively, the client device may default to a particular playlist based on device considerations and user preferences. For example, a user device may select the highest available quality playlist to maximize the user's visual experience. Alternatively, the user device may always select the lowest available quality to preserve power, etc. Still other variants may select an appropriate resolution so as to balance the other client device considerations (e.g., web browsing, games, other media playback, etc.)

At step 506, the client requests the desired playlist; responsively, the server determines whether the quasi-streamable asset is requested (step 556). If a streamable asset is selected, then the server provides the requested variant playlist as-is (either 720p or 480p). Otherwise, if the quasi-streamable asset playlist is requested, then the server instantiates a program instance to provide a file system-like application programming interface (API) to the archival MPEG-4 file (described in greater detail below). Additionally, the server generates a quasi-streamable asset playlist based on one of the available resolution playlists by, e.g., replacing the resolution identifier "720p" (or "480p") with "1080p"; as shown below, the quasi-streamable asset would appear to indicate the presence of a 1080p file structure (even though no such file structure exists):

./toplevelindex/playlist_1080
./toplevelindex/playlist_1080/segment_t0.ts
./toplevelindex/playlist_1080/segment_t1.ts
./toplevelindex/playlist_1080/segment_tN.ts As a brief aside, streaming protocols (HTTP Live Streaming (HLS), MPEG-DASH, etc.) are designed for content delivery networks that service large populations of users. Existing HLS implementations offload media playback state to the client device, i.e., the client device uses the master playlist to identify the appropriate URL corresponding to the current playback location in the media. Existing HLS servers do not parse the media files, they merely service URL addresses where pre-segmented HTTP-based segment downloads can be reached, without current playback state. As used herein, the term "state" and "stateful" refer to protocols that maintain an ongoing status. Stateful protocols require both the client and the server to remember their status. For example, if a client requests stateful media playback, the server must track the client's current playback progress. In contrast, "stateless" protocols do not require the server to retain session information or a status.

Figure 6:
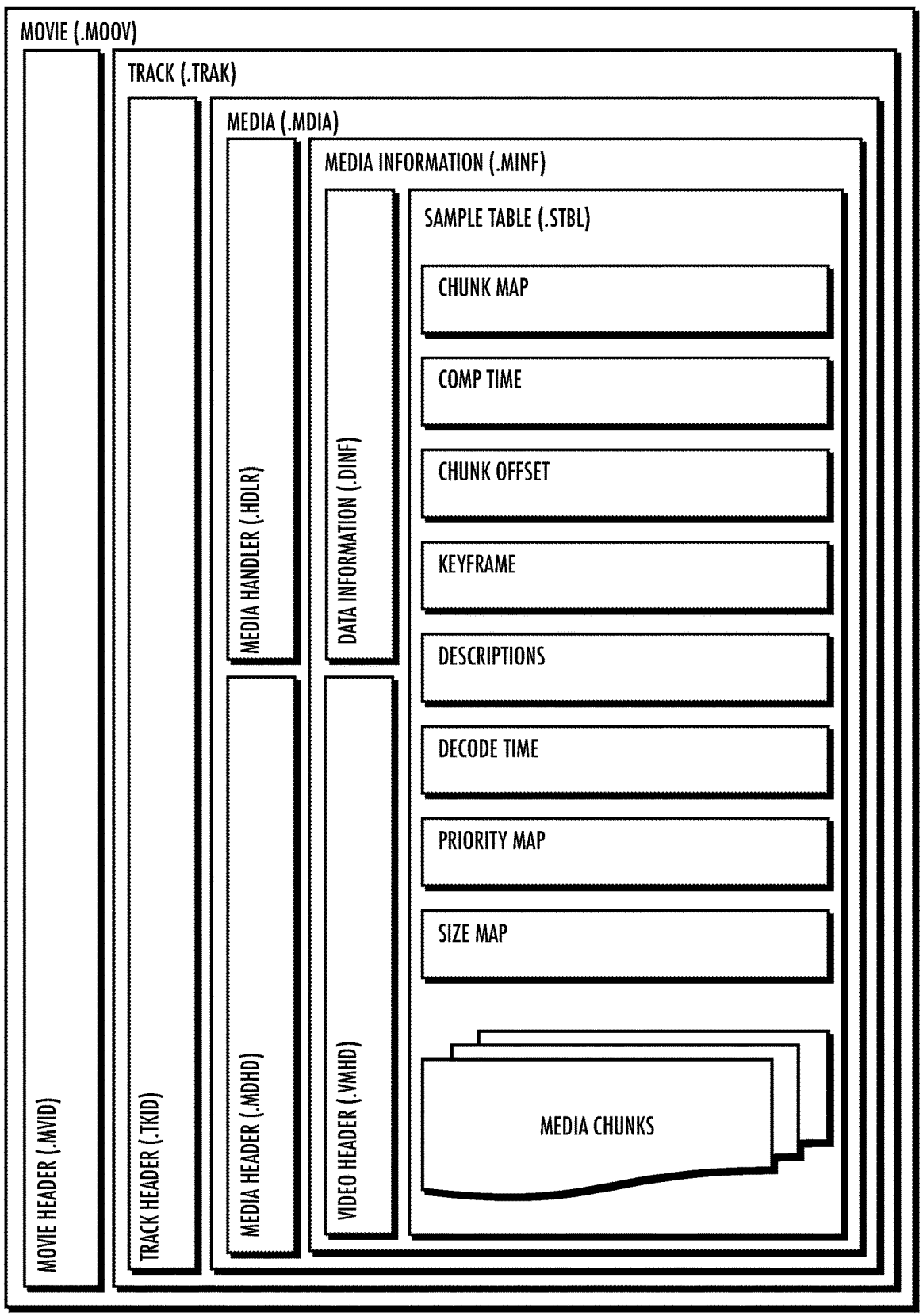
FIG. 6 provides a graphical illustration of one exemplary MPEG-4 file format, useful in explaining various aspects of the present disclosure.

FIG. 6 provides a graphical illustration of one exemplary MPEG-4 file format. Notably, MPEG-4 (and MPEG-2) supports segments of any arbitrary length (e.g., 1 second, 2 second, etc.) In this case, the natively captured user generated content is encoded with specific time increments (these are stored in the sample table, depicted in FIG. 6). Subsequent down-conversion to reduced resolution formats retains the same time increments. Thus, for example, the user's initially captured 1080p video may be segmented at 2 second divisions, which is preserved across each of the reduced resolution HLS versions (720p, 480p). Consequently, even though the MPEG-4 archival file is not segmented for HLS, the internal file structure can be de-referenced to obtain 2 second 1080p chunks.

As previously alluded to, the exemplary file system-like API is configured to parse the network HTTP socket requests for file structure locations and return packets with the data parsed from in an MPEG-4 file. Thus, a request for: ./toplevelindex/playlist_1080/segment_tX.ts would return the corresponding segment X parsed from the 1080p archival MPEG-4 file (e.g., based on the track, media, media information, sample table, chunk map, chunk offset, and decode time information stored therein).

In some embodiments, the archival MPEG-4 file is retrieved from the archival service and locally cached at the server; in other embodiments, the archival MPEG-4 file remains at the external archival service, and segments are pulled in near real-time, as needed.

In one exemplary embodiment, the program instance monitors ongoing playback state; this playback state can be used internally to fetch the MPEG-4 chunks from the archival file just-in-time. In other words, the program instance may use playback state to reduce unnecessary buffering and/or ensure that content is delivered in a timely manner. Additionally, since the exemplary program instance consumes processing resources for the duration of its operation, certain variants may "time-out" to conserve resources after a few minutes of inactivity or other indicia of disinterest (e.g., the client device switches to other tasks, etc.) Since there is no physical memory for the archival file, subsequent client requests would need to restart another program instance.

As used herein, the terms "on-the-fly" and/or "just-in-time" refer to logic, functionality, and/or operations that are performed responsive to a request, rather than prepared in-advance. In this specific example, the 1080p MPEG-4 archival file is transmuxed in a running program instance based on client requests (not retrieved from a memory cache). Since the MPEG-4 archival file is directly written into the packet payload contents, no additional file system storage is required. In other words, the HLS specific directory structure for 1080p is only an API interface and does not reside in physical memory. The techniques described herein trade-off stateful near real-time processing for stateless long term memory storage.

As used herein, the term "real-time" refers to tasks that must be performed within definitive time constraints; for example, a video camera must capture each frame of video at a specific rate of capture (e.g., 30 frames per second (fps)). As used herein, the term "near real-time" refers to tasks that must be performed within definitive time constraints once started; for example, a smart phone must render each frame of video at its specific rate of display, however some queueing time may be allotted. As used herein, "best effort" refers to tasks that can be handled with variable bit rates and/or latency. As but one such example, a user that wants to view a video on their smart phone can wait for a short delay for the smart phone to queue and post-process video. Live streaming applications of arbitrary duration are ideally handled at real-time or near real-time, since best effort treatment is likely to incur performance degradation.

Referring back to FIG. 5, the client requests segments for playback according to its master playlist (steps 508, 510). If a segment from the quasi-streamable asset playlist is requested (step 558), then the server's running program instance transmultiplexes chunks from the 1080p MPEG-4 archival file into an MPEG-2 HLS transport stream. MPEG-2 transport stream segments (from 720p and 480p) can be handled using the existing file structure. In this manner, a full 1080p MPEG-2 transport stream over HLS can be generated in near real-time to service the client device requests.

Transmuxing from MPEG-4 to MPEG-2 HLS transport stream just-in-time, enables HLS-like support for MPEG-4 without incurring the additional storage burden of different MPEG-4 resolutions for HLS. In other words, a MPEG-4 file can be streamed at a first resolution (e.g., 1080p), with a fallback to MPEG-2 HLS transport stream at a second/third resolution (e.g., 720p, 480p).

Methods

Figure 7:
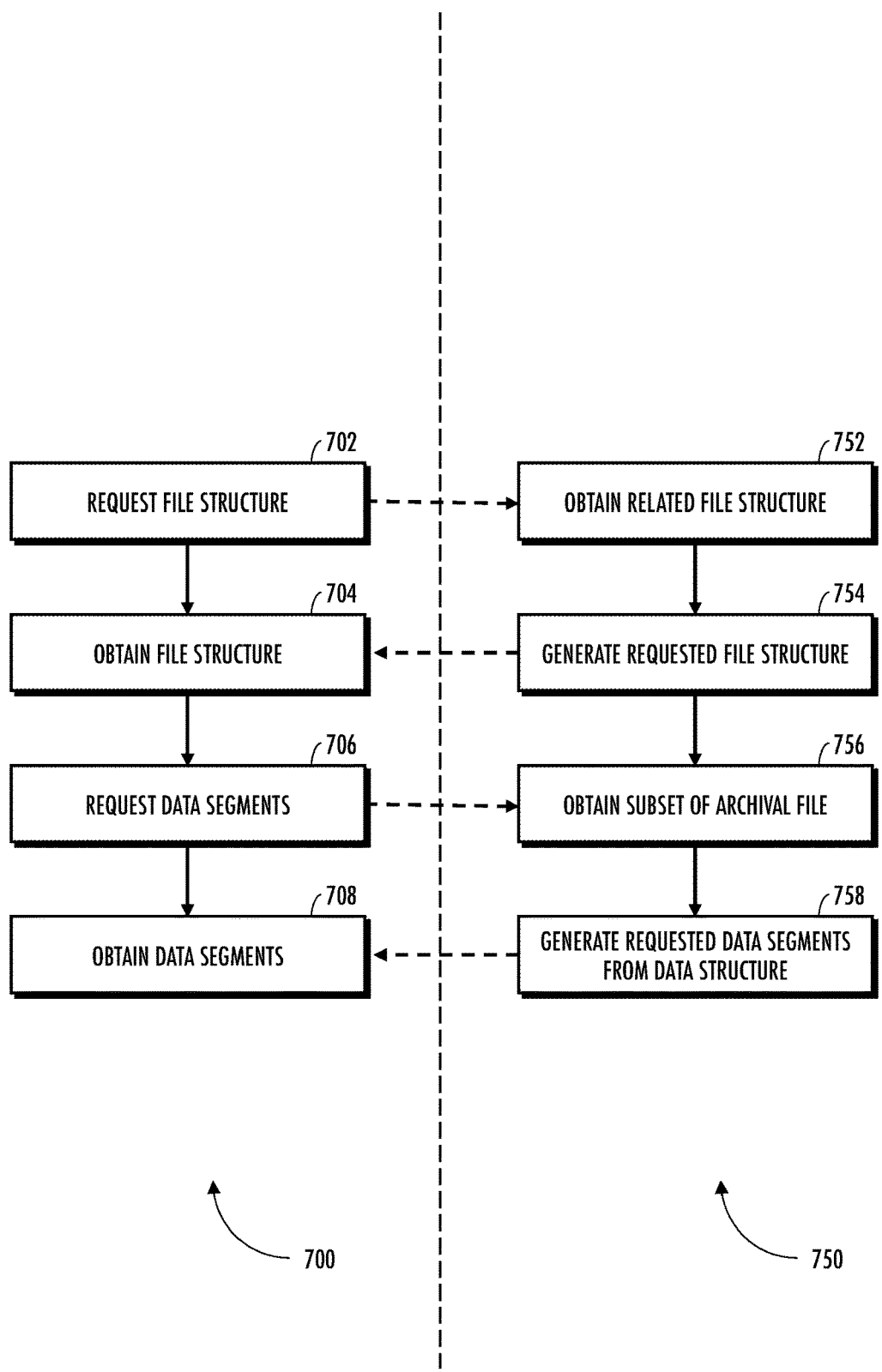
FIG. 7 depicts logical block diagrams of generalized methods for requesting streaming media and providing just-in-time quasi-streaming media, useful in explaining various aspects of the present disclosure.

FIG. 7 depicts logical block diagrams of a generalized method 700 for requesting streaming media, and a generalized method 750 for providing just-in-time quasi-streaming media. In one exemplary embodiment, the generalized method 700 may be performed, in whole or part, by a user device such as a user devices 306A, 306B, 306C depicted in FIG. 3. exemplary embodiment, the generalized method 750 may be performed, in whole or part, by a server such as the streaming media server 302 depicted in FIG. 3. Moreover, while the present discussion is described in the context of specific entities, the various functionalities may be combined, divided, merged, or otherwise re-apportioned. For instance, clients may serve as servers to a peer-to-peer network; in other cases, client devices may tether other client devices to the server network. Similarly, while the server communicates with an external archival service, various implementations may subsume archival functionality within the server and/or vice versa.

As used herein, the term "quasi-stream", "quasi-streaming", "quasi-streamable" and any other linguistic derivations thereof, refer to techniques for progressive delivery of media segments that are extracted from a media file in near real-time and/or just-in-time (responsive to a request, rather than prepared in-advance). While the foregoing discussion has been presented in the context of a software program instance that mimicks the presence of a static file system, other implementations may use hardware and/or firmware based logic that provides the same functional result.

At step 702 of the method 700, a first device requests a file structure. In one embodiment, the first device is a user device that requests a master playlist for a media file. Examples of user devices include without limitation: cameras (e.g., an action camera such as those manufactured by GoPro, Inc.), smart phones, media tablets, laptop computers, desktop computers, and/or any other device capable of rendering media. While the foregoing discussions are presented in the context of a device owned by a user retrieving the user's own generated content, the techniques described herein may be broadly applicable to any device that is requesting media content. For example, a user may share their content with family and friends. Similarly, social network applications may connect people with others of similar interests and/or activities by automatically propagating user media to others.

Furthermore, while the foregoing discussion is presented in the context of an archival service, artisans of ordinary skill in the related arts will readily appreciate that the techniques may be used in a variety of other contexts. For example, a user device may share their content with other users in a peer-to-peer fashion. The file system-like API allows for live streaming from local media without any additional memory requirements on the user's device. Similarly, disposable or otherwise transient media may be captured once, and available for playback for a short time via multiple different encodings. Such implementations may be useful for rolling captures (e.g., live broadcasts and multicasts).

In one embodiment, the requested file structure is a playlist of a series of data segments. The playlist is an ordered listing of each data segment; the listing may additionally include, e.g., metadata to describe time and/or playback parameters. For example, a playlist may specify video playback in designated time chunks, along with different variable bit rate resolutions, and/or codec parameters. While the foregoing discussion is presented in the context of temporally linear playback, the techniques described herein could be used to provide e.g., different spatial and/or thematic versions of the same media. For example, a 360° action camera may store its front and rear videos as separate tracks in the MPEG-4 file; the playlist may allow a client device to dynamically determine which viewpoint to stream. Similarly, a video editing software may store clips of interest as a non-sequential listing of chunks of the original video; during playback, the client device can quickly snip together an exciting version of events by playing the only clips of interest (and skipping clips that are not interesting).

While the present disclosure is primarily focused on audio/visual (AV) content, artisans of ordinary skill in the related arts will readily appreciate that the techniques described herein are broadly applicable to a wide range of different media. Examples may include e.g., audio, images, videos, text, data (e.g., as used in games or other immersive contexts), etc.

At steps 704 and 706, the first device obtains the file structure, and requests data segments based on the file structure. In one exemplary embodiment, the device requests data segments based on a variety of different client-side considerations. Examples of such considerations may include without limitation: device capabilities, user preferences, network availability, usage, or any other client-side consideration.

While the foregoing discussion was presented in the context of a user device that linearly streams video (e.g., an MPEG-2 transport stream via HLS), artisans of ordinary skill in the related arts will readily appreciate that a variety of other applications may be substituted with equal success. As but one such example, a user device may request data segments for video editing; in such cases, the appropriate portions of video may be requested with file system-like access (which are provided from the archival file directly). This may enable memory efficient editing, since the device only needs to pull down the fragments that it needs rather than the entire archival file.

While the foregoing examples are presented in the context of a file system-like access that does not require playback state coordination between the server and the client, there may be implementations where playback state can allow the server to facilitate faster performance. For example, in temporally linear playback, the client can inform the server that it wants to buffer a certain number of segments in advance; in such cases, the server can pre-fetch the desired segments in view of the client requests. As but another example, a client device that only wants to pull audio (or video) from the archival file can notify the server; responsively, the server can more easily target the relevant portions of the archival file. In yet another example, a client device may have different preferences; for example, a client may only want to stream the highest quality available 1080p regardless of network conditions (e.g., dropped packets may be acceptable). Under these circumstances, the client would not request any of the fallback resolutions (720p, 480p).

At step 708, the first device obtains the requested data segments. In one embodiment, the device obtains video segments for streaming playback (e.g., HLS via an MPEG-2 transport stream) from the media server. However, artisans of ordinary skill in the related arts will readily appreciate that the techniques described herein may be broadly applicable to any data distribution system. Since the file system-like instance merely uses a program instance to mimic static file systems, the data segments may be hosted from any program instance identified in the file structure. For example, a content server may provide a playlist that has URLs that are serviced by a program instance running on the archival file system. This may be particularly useful where the archival file system is a $3^{rd}$ party cloud network provider that charges processing and/or memory according to usage, and the content server's own resources may be more feasibly used elsewhere. As but another example, the content server may re-direct a user device to a nearby peer that has already requested the same content. The peer user device may execute a file system-like program instance, and service the playlist URL.

Referring now to method 750, a second device obtains a related file structure, based on a requested file structure at step 752. In one embodiment, the related file structure corresponds to divisions within a data structure. For example, an MPEG-4 media file is internally segmented into audio and/or visual media based on internal chunking. Any playlist that preserves the MPEG-4 media files internal chunking may be used with only minor modifications; thus, a down-converted version of the MPEG-4 file may be substituted with minor alteration.

While the foregoing discussion is presented in the context of a content server that has media playlists locally cached, other implementations may need to obtain the related file structure. As but one such example, a peer-to-peer network may require one of the peer devices to obtain a playlist, for distribution to the peer-to-peer network. In another such example, a content server may offload quasi-streaming functionality to an archival service; the archival service may need to obtain a copy of the playlist.

More broadly however, the related file structure need only specify how the data structure is divided. For example, metadata that specifies the MPEG-4 chunking may be used to generate HTTP file download addresses for use with a file system-like API. As but one such example, a MPEG-4 file that has a keyframe every 2 seconds may be chunked based on the keyframe locations. In some cases, manufacturers may manufacture their device with a deterministic behavior. For example, a camera manufacturer may configure their cameras to record in 2 second chunks. Various other techniques for deriving a related playlist (or any other form of file structure) based on MPEG file may be readily substituted by artisans of ordinary skill in the related arts, given the contents of the present disclosure.

At step 754, the second device generates the requested file structure based on the related file structure. In one embodiment, a playlist for a non-existent file system is created; in one specific implementation, the playlist corresponds to a file system-like application programming interface (API) for obtaining HTTP file download addresses for an MPEG-2 transport stream from an MPEG-4 file.

In one exemplary embodiment, the requested playlist is generated from a playlist corresponding to a different HLS bit rate. As but one such example, a 1080p playlist may be generated from the 720p playlist for the same media file, since HLS uses a consistent file structure for variable bit rate operation. For example, 2 second clips of a 1080p video can be replaced with 2 second clips of either 720p or 480p, so long as the time reference is shared (different time bases would result in alignment issues). More directly, HLS uses the same time intervals across all bit rates, such that differences in network connectivity only cause reductions in image quality instead of erratic skips in playback time.

In one exemplary embodiment, the requested playlist is generated from a playlist corresponding to a different HLS bit rate. As but one such example, a 1080p playlist may be generated from the 720p playlist for the same media file, since HLS uses a consistent file structure for variable bit rate operation. For example, 2 second clips of a 1080p video can be replaced with 2 second clips of either 720p or 480p, so long as the time reference is shared (different time bases would result in alignment issues). More directly, HLS uses the same time intervals across all bit rates, such that differences in network connectivity only cause reductions in image quality instead of erratic skips in playback time.

While the foregoing discussion is presented in the context of temporally linear playback, artisans of ordinary skill in the related arts will readily appreciate that any correspondence can be used to generate the requested playlist from the related file structure. For example, as previously noted, a 360° action camera may store its front and rear videos as separate tracks in the MPEG-4 file; in one such variant, the front camera playlist can be used to generate the rear camera playlist (or vice versa). As but another such use case, a user can edit the 360° video by associating specific vantage points to specific key frames; the playlist can be re-used for quick review and touch-up edits by using the key frame edits and cut-and-feather stitching to modify the corresponding portions of the natively captured 360°. Notably, editing in this manner does not require a local version of the 360° MPEG-4.

Still other embodiments may use these techniques to thematically organize replay. For example, an edited video may identify which URLs of the of the playlist are "highlights" and which URLs are merely transitory and/or "flavor" shots. During subsequent replay, the non-critical portions of the playlist can be abbreviated or dynamically swapped with other user-generated content that is of similar thematic content.

At steps 756 and 758, the second device obtains a subset of a data structure based on a request for a data segment and generates the requested data segment from the subset of the data structure. In one exemplary embodiment, a program instance running on the content server receives HTTP requests for file downloads at specific URLs which are not backed by a file system. In response, the content server de-references the corresponding MPEG-4 file, and identifies the chunk corresponding to the file system-like URL query. The chunk is packetized into an MPEG-2 transport stream packet and delivered to the requesting device.

As a brief aside, so-called reference data structures "point" or "reference" a location of data in memory. Typically, a reference data structure stores a memory address that is interpreted by a program as an absolute location or a relative location in system memory based on e.g., a base address, reference address, memory window, or other memory subset. During operation, a reference data structure is "de-referenced" to recover the data that is stored in the location of memory. The exemplary MPEG file format described herein relies on a number of different reference data types to access the media chunks stored within. For example, any arbitrary media chunk may be identified by e.g., identifying its track, locating the corresponding media and video portion, and referencing the chunk offset according to the chunk map. Other schemes may identify media chunks according to e.g., keyframe, decode time, etc.

In one embodiment, the media chunk may be transmultiplexed into the appropriate MPEG-2 transport stream format for delivery in accordance with HLS protocols. In other embodiments, the media chunk may be transcoded into a different resolution, etc. Even though transcoding requires more processing overhead, this may be preferable where other system wide considerations are more pressing. For example, under severe network congestion, a native resolution segment may be transcoded down to the most suitable quality for transfer.

In one exemplary embodiment, the program instance performs the transmuxing or transcoding in near real-time. In other words, the program generates one or more packets for delivery as the client requests the HTTP file download from the URL. In some such variants, the program instance predictively performs the transmuxing or transcoding justin-time; for example, if the URL for the first packet is requested, an additional second, third, etc. packet may also be responsively generated in addition to the first packet. Pre-queuing in this manner is particularly useful for temporally linear playback. More directly, pre-queued packets can be stored in general memory buffers; packets do not require the dedicated addressing and resources that a directory structure (or other static or semi-static file system would require).

Apparatus

Figure 8:
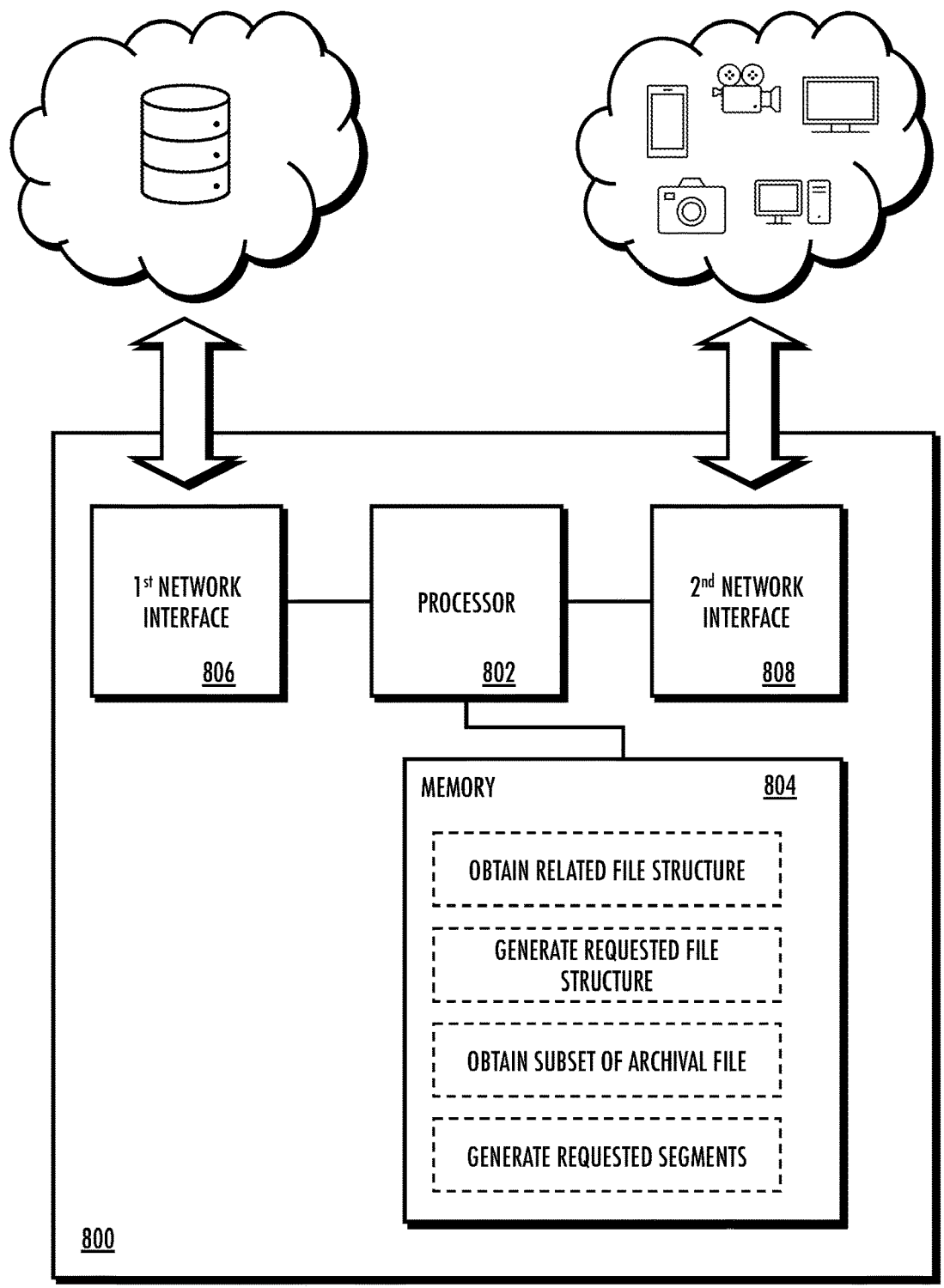
FIG. 8 is a logical block diagram of one exemplary server apparatus, useful in accordance with the various principles described herein

FIG. 8 is a logical block diagram of one exemplary server apparatus 800, useful in accordance with the various principles described herein. In one embodiment, the server apparatus 800 includes a processor 802, non-transitory computer-readable medium 804, and one or more network interfaces (e.g., a first network interface 806, and a second network interface 808).

The components of the exemplary server apparatus 800 are typically provided in a housing, cabinet or the like that is configured in a common manner for a server or related computing device. It is appreciated that the embodiment of the server 800 shown in FIG. 8 is only one exemplary embodiment of a server 800 for quasi-streaming media. As such, the exemplary embodiment of the server 800 described herein with reference to FIG. 8 is merely representative of any of various manners or configurations of servers or other data processing systems that are operative in the manner set forth herein.

The processing circuitry/logic 802 of the server 800 is operative, configured, and/or adapted to operate the server 800 including the features, functionality, characteristics and/or the like as described herein. To this end, the processing circuit 802 is operably connected to all of the elements of the server 800 described below.

The processing circuitry/logic 802 of the host server is typically controlled by the program instructions contained within the memory 804. The program instructions 804 are configured to quasi-stream media just-in-time, as described in further detail supra. The exemplary file system APIs, executing as program instances at the server 800 may be configured to communicate with and exchange data with a client-side application running on a processor of a user's device. In addition to storing the instructions, the memory 804 may also store data for use by the quasi-streaming media program. As previously described, the data may include the cached versions of the media including, e.g., cached versions of the media according to different bit rates.

While the foregoing examples are presented in the context of program instructions stored in non-transitory computer-readable memory, that are executed by a processor, other implementations of logic may be substituted with equal success by artisans of ordinary skill given the contents of the present disclosure. Examples of such logic may include e.g., application specific integrated circuits (ASICs) that are fabricated from combinatorial (AND, OR, NOR, NAND, XOR, etc.) and/or sequential logic (flip flops, latches, etc.), programable logic arrays, and look-up-table implementations of combinatorial/sequential logic (e.g., programmable logic devices (PLDs) and/or field programmable gate arrays (FPGAs)).

The network interfaces of the server 800 allow for communication with various devices using various means. In one particular embodiment, the network interface is bifurcated into a first network interface 806 for communicating with other server apparatuses and/or external archival file systems. The network interface 808 is configured to communicate with a population of client devices. Other implementations may combine these functionalities into a single network interface, the foregoing being purely illustrative.

In one exemplary embodiment, the first network interface 806 is a wide area network port that allows for communications with remote computers over the Internet (e.g., external databases). The first network interface 806 may further include a local area network port that enables communication with any of various local computers housed in the same or nearby facility. In at least one embodiment, the local area network port is equipped with a Wi-Fi transceiver or other wireless communications device. Accordingly, it will be appreciated that communications with the server 800 may occur via wired communications or via the wireless communications. Communications may be accomplished using any of various known communications protocols.

In one exemplary embodiment, the second network interface 808 is a network port that allows for communications with a community of user devices. The second network interface 808 may be configured to interface to a variety of different networking technologies consistent with consumer electronics. For example, the network port may provide HTTP-based access via a Local Area Network, Wi-Fi network, cellular network, etc.

While the foregoing discussion is presented in the context of Ethernet and/or Internet Protocol (IP) based networking protocols, other communication protocols may be substituted with equal success by artisans of ordinary skill given the contents of the present disclosure. Examples of such protocols may include e.g., real-time protocol (RTP), user datagram protocol (UDP), SONET (synchronous optical networking), synchronous digital hierarchy (SDH), asynchronous transfer mode (ATM), Gigabit Ethernet, etc.

In one embodiment, the server 800 is specifically configured to provide quasi-streaming access to media in accordance with the principles described above. In particular, the illustrated server apparatus 800 stores one or more computer-readable instructions that when executed e.g., obtains a related file structure, generates a requested file structure based on the related file structure, obtains a subset of an archival file, and generates requested segments from the archival file. In one exemplary embodiment, the server 800 is configured to provide a program instance that provides a file system-like application programming interface (API). The program instance is configured to generate MPEG-2 transport streams from MPEG-4 archival data, based on HTTP Live Streaming (HLS) or MPEG-DASH file system queries.

Technological Improvements and Other Considerations

The above-described system and method solves a technological problem in industry practice related to providing archival data in near real-time or just-in-time. Existing content delivery networks are optimized for stateless media transactions with a large population of clients. In one specific instance, the content server creates a stateful program instance that can service a client's media requests from their archival data. The program instance provides the client device the illusion of a static file system, however client requested access to HTTP file downloads are provided in packets that are transmuxed/transcoded from archival data in long-term storage. The packet payloads are generated responsive to the client's request, by de-referencing the archival data's specific data structure. The various solutions described herein directly address a problem that is unique to providing access to client-specific data archives anytime, anywhere.

As a related consideration, existing techniques for data archival assume that the archival data is seldom used. As a practical matter, archival file systems often provide very reliable and robust storage, but at slow access times. Archival file systems are not designed to provide access for streaming media playback. The various solutions described herein specifically address a different usage scenario; as described above, a large population of infrequently active users can be serviced without memory, by using state-based program instances to mimic stateless file systems. In other words, the techniques described herein represent an improvement to the field of data archival and access thereto.

Furthermore, the above-described system and method improves the functioning of the computer/device by reducing the memory requirements for a variable bit rate streaming service. In one specific instance, HTTP Live Streaming (HLS) (and/or MPEG-DASH) assume the presence of multiple bit rate files that can be arbitrarily accessed at any time via URL addresses. The above-described system and method specifically minimizes file system requirements by de-referencing archival media and translating HTTP data requests into media indexing. The identified chunks can be transmuxed or transcoded into a suitable transport stream (MPEG-2 transport stream) for delivery via HLS (or MPEG-DASH). Such techniques are broadly applicable to any usage environment where server processing bandwidth is capable of matching client requests.

Additional Configuration Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant or implementation. The appearances of such phrases in various places in the specification are not necessarily all referring to the same embodiment, variant or implementation.

As used herein, the term "computer program" or "software" is meant to include any sequence of human or machine cognizable steps which perform a function. Such program may be rendered in virtually any programming language or environment including, for example, Python, JavaScript, Java, C#/C++, C, Go/Golang, R, Swift, PHP, Dart, Kotlin, MATLAB, Perl, Ruby, Rust, Scala, and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A method for quasi-streaming media, the method comprising:
   receiving a first request for a non-existent first data structure of a static file system at a streaming media server;
   obtaining a second data structure that is related to the non-existent first data structure;
   instantiating a file system-like application programming interface at the streaming media server that generates a requested data structure from the second data structure;
   receiving a second request for data segments based on the requested data structure at the streaming media server;
   obtaining a subset of an archival file; and
   generating quasi-streaming data segments from the subset of the archival file.

2. The method of claim 1, further comprising:
   determining that at least one of a client device capability and a network connection quality supports quasi-streamable operation; and
   returning a master playlist that includes the requested data structure and the second data structure.

3. The method of claim 1, further comprising:
   determining that the archival file is accessible via an external network connection; and
   returning a master playlist that includes the requested data structure and the second data structure.

4. The method of claim 1, further comprising providing progressive playback of the archival file via the quasi-streaming data segments.

5. The method of claim 1, further comprising retrieving streaming data segments from the static file system; and
   providing variable bit rate service based on the quasi-streaming data segments and the streaming data segments.

6. The method of claim 1, wherein generating the quasi-streaming data segments from the subset of the archival file comprises transmuxing an MPEG-4 file into a MPEG-2 transport stream.

7. The method of claim 1, wherein generating the quasi-streaming data segments from the subset of the archival file comprises transcoding an MPEG-4 file into a MPEG-2 transport stream.

8. A streaming media server apparatus, comprising:
   a first network interface configured to communicate with an archival file system;
   a second network interface configured to communicate with a client device;
   a processor; and
   a non-transitory computer-readable medium that stores instructions which when executed by the processor, causes the streaming media server apparatus to:
   store streaming assets within a static file structure;
   receive a request for a non-existent streaming asset from the client device;
   access an archival file via the first network interface;
   instantiate a file system-like application programming interface that generates quasi-streaming data segments from the archival file; and
   provide the quasi-streaming data segments to the client device via the second network interface.

9. The streaming media server apparatus of claim 8, wherein the streaming assets are HTTP-based segment downloads and the static file structure is addressable via URL addressing.

10. The streaming media server apparatus of claim 8, wherein the archival file system is configured to store MPEG-4 audio visual content in its originally captured format.

11. The streaming media server apparatus of claim 8, wherein the instructions, when executed, further cause the streaming media server apparatus to:
    de-reference the archival file to retrieve media chunks corresponding to a playback time; and
    packetize the media chunks into the quasi-streaming data segments for the playback time.

12. The streaming media server apparatus of claim 8, wherein the instructions, when executed, further cause the streaming media server apparatus to:
    decode at least a portion of the archival file to generate media segments; and
    encode the media segments into the quasi-streaming data segments.

13. The streaming media server apparatus of claim 8, wherein the instructions, when executed by the processor, further cause the streaming media server apparatus to provide the streaming assets or the quasi-streaming data segments based on network connectivity.

14. The streaming media server apparatus of claim 8, wherein the instructions, when executed by the processor, further cause the streaming media server apparatus to provide the archival file in its originally captured format.

15. A non-transitory computer-readable medium that stores instructions which when executed by a processor, causes the processor to:
    store streamable assets within a static file structure;
    instantiate a file system-like application programming interface that provides access to quasi-streamable assets via a non-existent file structure by generating quasi-streaming data segments from an archival file;
    provide a master playlist with the streamable assets and the quasi-streamable assets; and
    provide data segments from the streamable assets and the quasi-streamable assets in response to data segment requests.

16. The non-transitory computer-readable medium of claim 15, wherein the static file structure is accessible via URL addresses.

17. The non-transitory computer-readable medium of claim 15, wherein the file system-like application programming interface monitors ongoing playback state of a client device.

18. The non-transitory computer-readable medium of claim 17, wherein the file system-like application programming interface is configured to time-out when the ongoing playback state is inactive.

19. The non-transitory computer-readable medium of claim 17, wherein the processor is further configured to provide access to originally captured content.

20. The non-transitory computer-readable medium of claim 17, wherein the data segments are selected from the streamable assets or the quasi-streamable assets based on at least one of a client device capability and a network connection quality.

* * * * *